United States Patent
Harel et al.

(10) Patent No.: US 9,264,178 B2
(45) Date of Patent: Feb. 16, 2016

(54) GENERAL PHASE PERTURBATION METHOD

(71) Applicant: GOOGLE INC., Mountain View, CA (US)

(72) Inventors: Haim Harel, New York, NY (US); Eduardo Abreu, Allentown, PA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/351,285

(22) PCT Filed: Oct. 12, 2012

(86) PCT No.: PCT/US2012/059959
§ 371 (c)(1),
(2) Date: Apr. 11, 2014

(87) PCT Pub. No.: WO2013/056052
PCT Pub. Date: Apr. 18, 2013

(65) Prior Publication Data
US 2014/0233674 A1    Aug. 21, 2014

Related U.S. Application Data

(60) Provisional application No. 61/547,323, filed on Oct. 14, 2011.

(51) Int. Cl.
*H04L 1/00* (2006.01)
*H04B 7/02* (2006.01)
*H04B 7/06* (2006.01)

(52) U.S. Cl.
CPC .............. *H04L 1/0033* (2013.01); *H04B 7/026* (2013.01); *H04B 7/0623* (2013.01); *H04B 7/0682* (2013.01)

(58) Field of Classification Search
CPC ........ H04B 7/06; H04B 7/061; H04B 7/0617; H04B 7/0619; H04B 7/0689; H04B 17/24
See application file for complete search history.

(56) References Cited

U.S. PATENT DOCUMENTS 6,892,059 B1 * 5/2005 Kim et al. ............... 455/272
2006/0270359 A1 * 11/2006 Karmi et al. ............ 455/69
(Continued)

FOREIGN PATENT DOCUMENTS

| WO | 2008/057471 | 5/2008 |
| WO | 2008/113025 | 9/2008 |
| WO | 2008/113037 | 9/2008 |

OTHER PUBLICATIONS

International Search Report and Written Opinion, European Patent Office, Application No. PCT/US2012/059959, Jul. 15, 2013.

*Primary Examiner* — Aristocratis Fotakis
(74) *Attorney, Agent, or Firm* — Troutman Sanders LLP; James E. Schutz; Scott D. Barnett

(57) ABSTRACT

A method for modifying a signal transmitted from a mobile communication device comprising perturbing a transmit diversity parameter from its nominal value by modulating the parameter with respect to the nominal value in alternating directions, receiving a feedback signal including feedback information relating to the modified signal as received at a feedback device, and based at least on the feedback information, adjusting the nominal value of the transmit diversity parameter by increasing, decreasing, or preserving the nominal value. The perturbations are selected to minimize phase discontinuities.

11 Claims, 4 Drawing Sheets

(56) References Cited

U.S. PATENT DOCUMENTS

| | | |
|---|---|---|
| 2008/0123775 A1* | 5/2008 | Abreu et al. .................. 375/299 |
| 2008/0139135 A1 | 6/2008 | Abreu et al. |
| 2008/0160922 A1* | 7/2008 | Sun et al. .................. 455/67.14 |
| 2008/0227404 A1* | 9/2008 | Harel et al. .................... 455/69 |
| 2008/0227414 A1* | 9/2008 | Karmi et al. .................. 455/101 |
| 2011/0281610 A1 | 11/2011 | Abreu et al. |
| 2012/0071194 A1 | 3/2012 | Harel |
| 2012/0183089 A1 | 7/2012 | Abreu et al. |
| 2013/0122823 A1* | 5/2013 | Harel et al. ................ 455/67.16 |

* cited by examiner

GENERAL PHASE PERTURBATION METHOD

CROSS REFERENCE TO RELATED APPLICATIONS

This application claims priority to U.S. provisional patent application Ser. No. 61/547,323, filed on Oct. 14, 2011, which is incorporated herein by reference in its entirety.

FIELD

This disclosure relates generally to the field of wireless communications and more specifically to modifying a signal by controlling transmit diversity parameters. More particularly, phase perturbated signals are provided to two antennas, said signals being selected to reduce phase discontinuity at the receiver.

BACKGROUND

A modifying communication device includes multiple antenna elements that transmit signals to communicate information. A feedback communication device extracts information from the transmitted signals. The multiple antenna elements enhance spectral efficiency, allowing more users to be served simultaneously over a given frequency band. The transmitted signals, however, propagate along different paths and may reach the receiving communication device with different phases that destructively interfere. It is generally desirable to apply a relative phase between the two transmit signals to compensate for the phase difference due to the different paths or fading so that constructive interference can be achieved at the receiver.

The phase perturbation method may be used to derive the proper applied phase for obtaining constructive interference at the receiver. The phase perturbation method comprises perturbing the nominal value of the phase difference of two transmit diversity antennas continuously in alternating directions. Feedback information from the receiver is used to adjust the nominal valued of the phase difference so as to achieve constructive interference of the signals.

A problem with this technique is that ideally, the phase perturbation should only change the phase difference of the transmitted signals without affecting the phase of the combined received signal. Any discontinuity in the phase of the received signal is undesirable as it may interfere with the receiver channel estimation or SIR estimation and deteriorate the data decoding performance of the receiver.

As a solution to the disadvantages and problems associated with previous phase perturbation methods, a technique has been suggested for modifying signals using symmetrical phase perturbation. In symmetric perturbation the changes in the phase difference are accomplished by adjusting the phase of one antenna by half the desired phase difference change in one direction and the phase of the other antenna by half the desired phase difference change in the opposite direction. Symmetric perturbation results in less phase discontinuity for the combined (i.e. beam-formed) signal than asymmetric perturbation (where all the desired phase difference change is applied to one of the antennas only).

The phase discontinuity can be further reduced by reducing the size of the perturbation, i.e. by creating smaller changes in the phase difference, and/or by doing the perturbation less frequently. In either case the perturbation may become less efficient, in particular under fast changing environment conditions.

The perturbation technique may be applied with specific system independent quality indicators such as the power control of CDMA and WCDMA systems. This approach may have the advantage of being transparent to the network and have little or substantially no impact on the specific interface as defined by the standards.

SUMMARY

In order to reduce phase discontinuity at the receiver, new phase perturbation methods are introduced.

Briefly, a method of modifying a signal transmitted from a modifying communication device in communication with a feedback communication device includes perturbing a transmit diversity parameter from its nominal value at a perturbation rate, receiving a feedback signal at a feedback rate from the feedback communication device, the feedback signal including feedback information relating to the receipt of the perturbed signal at said feedback communication device, and, based on said feedback communication, adjusting the nominal value of said transmitted diversity parameter by a differential value, wherein said differential value is a fraction less than one of said nominal value.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
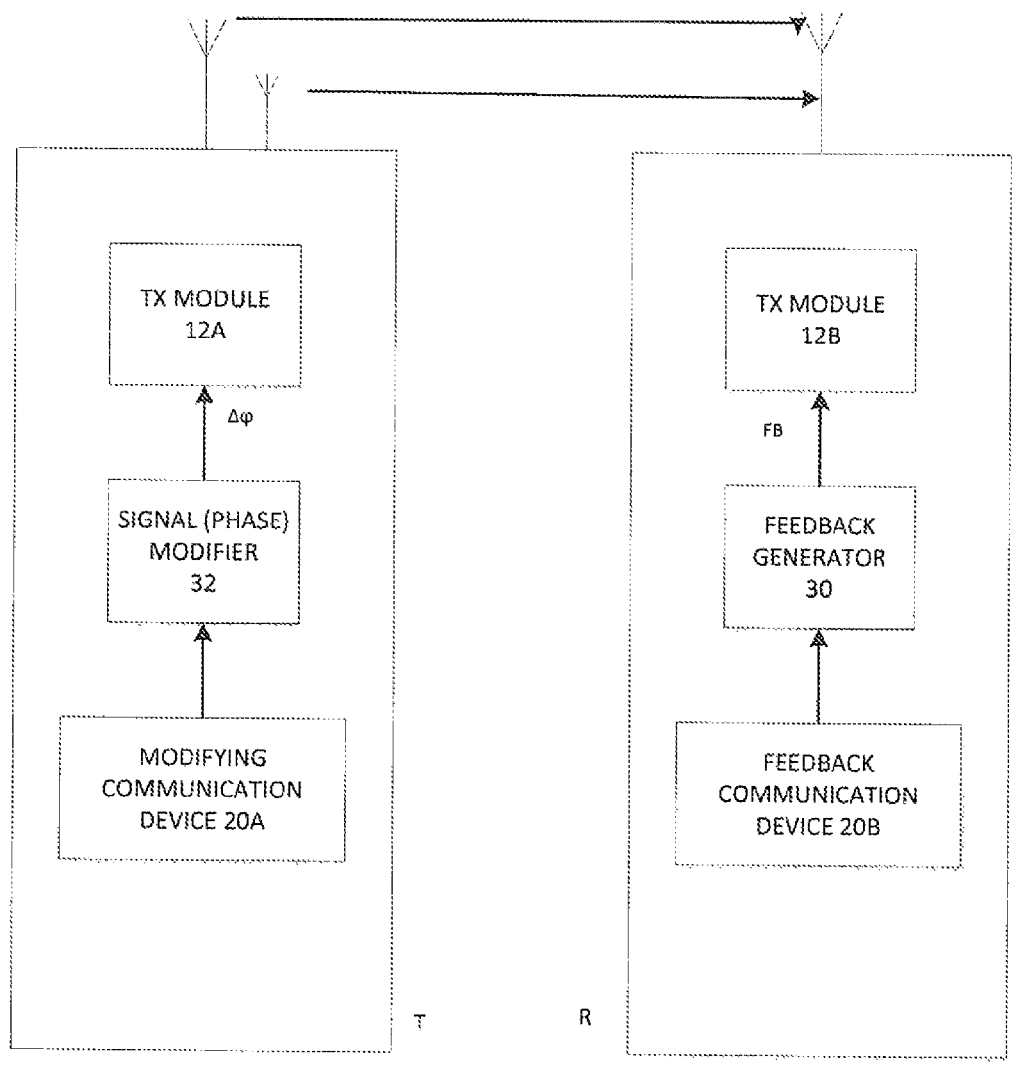
FIG. 1 is a block diagram illustrating an example of a communication network that includes a modifying communication device that adjusts a nominal value of a transmit diversity parameter.

FIG. 1 shows a block diagram illustrating one example of a communication network 10 that includes a transmitter T and a receiver R. The transmitter T includes at least two antennas 100A, 100B and sends data and control signals 24 to the receiver R. The receiver includes at least one antenna 110 receiving signals 24.

The transmitter T also includes a transceiver module 12A, a modifying communication device 20A and a signal (phase) modifier 32. In this example, modifying communication device 20A performs a procedure for determining a modification (e.g., phase perturbation signal) signal, such as the transmit diversity parameter, at a perturbation rate and transmits the signal to the receiver R.

The receiver R includes a transceiver module 12B, a feedback communication device 20B that receives the transmit diversity signal and controls a feedback generator 30. The feedback generator generates and returns feedback information that describes the transmit diversity signal from the device 20A as received by receiver R. Modifying communication device 20A adjusts a nominal value of a transmit diversity parameter at a nominal value adjustment rate based on the feedback information.

Figure 2:
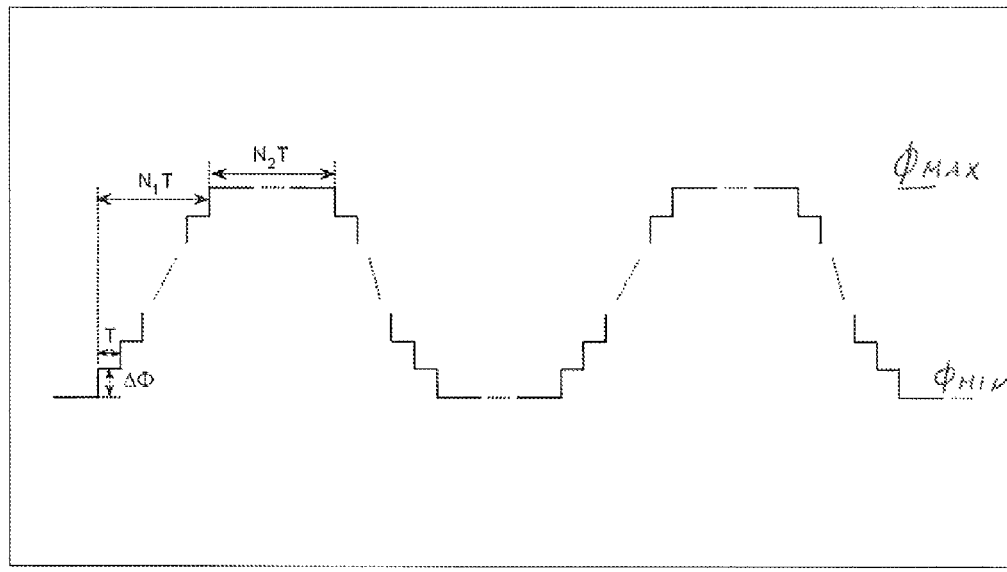
FIG. 2 shows a general perturbation pattern in steady state used to perturbate a signal, such as a transmit diversity parameter sent from the transmitter to the receiver.

As previously discussed, prior art phase perturbation techniques produced undesirable phase discontinuity at the receiver R. In order to solve this problem, a new phase perturbation method is introduced. FIG. 2 shows a general phase perturbation pattern in steady state, where $N_1$, $N_2$, T and $\Delta\phi$ are adjustable parameters. It is assumed that a feedback signal (e.g., transmit power control or TPC) is received from receiver R (e.g. base station) every time interval T (a positive feedback denotes power down, meaning that the transmitter reduces the power of the transmitted signals, and a negative feedback denotes power up).

Figure 3:
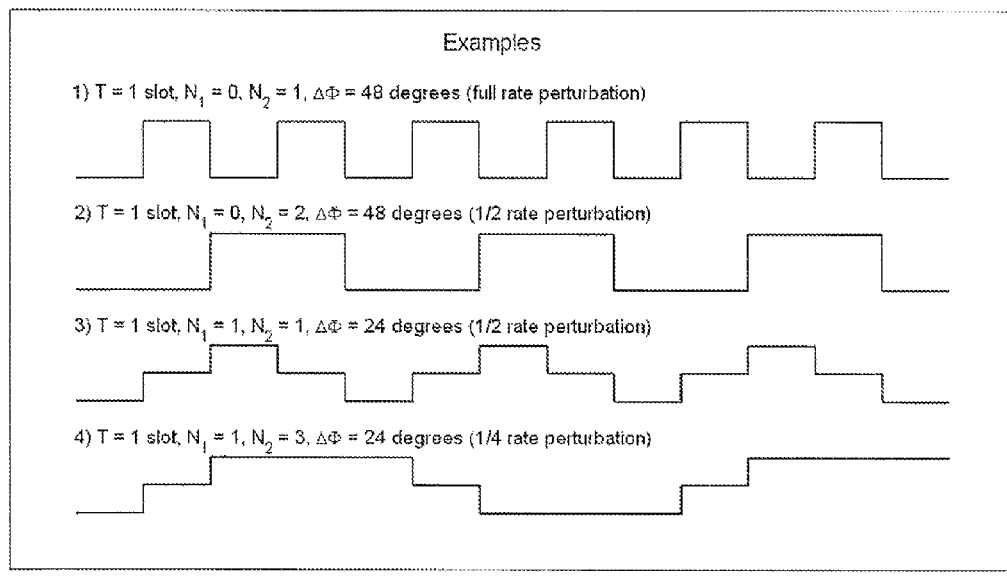
FIG. 3 shows examples of various perturbations for various values of $N_1$, $N_2$, T and $\Delta\phi$.

When $N_1=0$ the perturbation changes direction abruptly and traditional perturbation is obtained (FIG. 3, examples 1 and 2). For $N_1 \geq 1$ novel patterns are formed with at least one intermediate value between minimum and maximum (FIG. 3, examples 3 and 4). These transitional values create smaller changes in the phase difference and, therefore, reduce the phase discontinuity caused by the perturbation helping keep it within acceptable limits. The peak to peak value of the phase perturbation is $(N_1+1)\Delta\phi$. The peak to peak value can be, for example, 48 degrees.

In FIGS. 2 and 3 the nominal value of the phase difference is constant. Due to continual environment changes, the nominal value must be dynamically adjusted. The adjustment can be performed at the feedback rate (e.g. every slot), or at a slower rate (e.g. every two or more slots). In some embodiments the adjustment is made at twice the phase perturbation rate, i.e. two adjustments per perturbation period.

Procedures for updating the nominal value are based on information derived from the feedback signal. For example, a feedback signal may indicate an improvement in one perturbation direction compared to the other direction, in which case, the nominal value may be adjusted in that one direction by a certain amount. In some cases, such as when little or no improvement is detected in either direction, no adjustment is made and the nominal value is preserved.

In some embodiments, feedback information comprising one perturbation period, i.e. $2(N_1+N_2)$ feedback values, is used to update the nominal value. The feedback values are arranged in a sequence and ordered according to the time they are received. Thus, for a feedback sequence of length $2(N_1+N_2)$ there are $2^{2(N_1+N_2)}$ possible outcomes. Of particular significance is the novel phase pattern of FIG. 3, example 3, shown in detail in FIG. 4. Here, four feedback values are used to update the nominal value with 16 possible outcomes. A procedure for updating the nominal value for this particular pattern can be defined through using 16×4 lookup tables, as follows.

Figure 4:
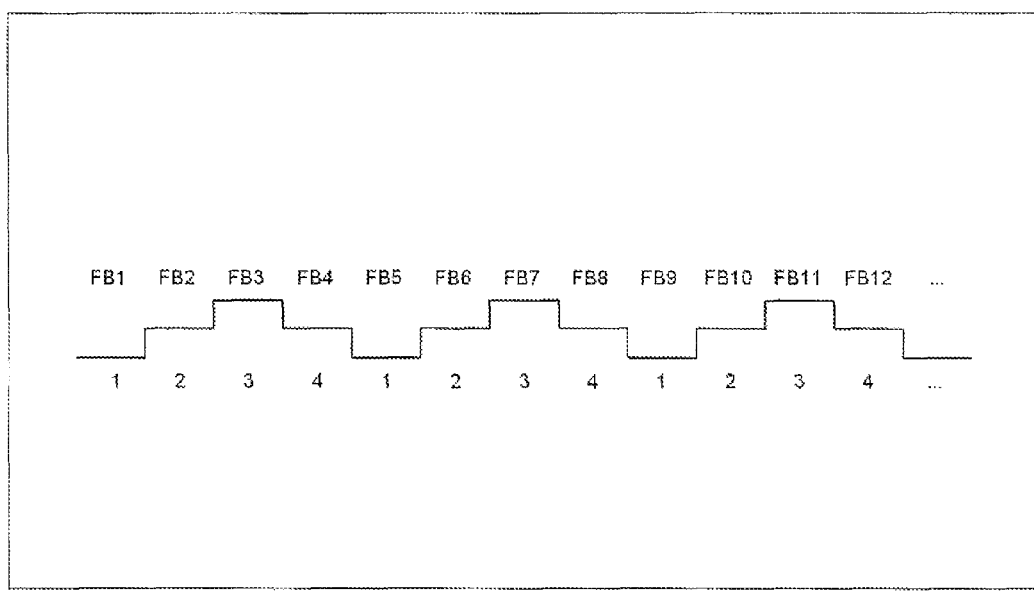
FIG. 4 shows a representation of example 3 from FIG. 3 in greater details.

First, four types of feedback sequences are defined, Type 1, Type 2, Type 3 and Type 4, based on where the first feedback is located with respect to the phase pattern. The feedback values are indicated in FIG. 4 as FB1, FB2, etc., where each value is associated with the phase difference directly below it (the feedback delay introduced by the system is not shown). For Type 1 sequences the first feedback corresponds to a minimum value in the pattern, indicated by time slot 1 in FIG. 4. Similarly, Types 2, 3 and 4 sequences start at locations indicated by time slots 2, 3 and 4, respectively. Thus, the sequences are:

Type 1: {FB1, FB2, FB3, FB4}, {FB5, FB6, FB7, FB8}, etc.
Type 2: {FB2, FB3, FB4, FB5}, {FB6, FB7, FB8, FB9}, etc.
Type 3: {FB3, FB4, FB5, FB6}, {FB7, FB8, FB9, FB10}, etc.
Type 4: {FB4, FB5, FB6, FB7}, {FB8, FB9, FB10, FB1}, etc.

Next, four phase adjustment tables are defined, one for each feedback sequence type, as illustrated in Tables 1-4.

TABLE 1

Phase adjustment table for Type 1 feedback sequences

| Feedback Information (Type 1) | | | | Nominal value adjustment |
|---|---|---|---|---|
| +1 | +1 | +1 | +1 | No change |
| +1 | +1 | +1 | −1 | No change |
| +1 | +1 | −1 | +1 | −Δϕ |
| +1 | +1 | −1 | −1 | −Δϕ |
| +1 | −1 | +1 | +1 | No change |
| +1 | −1 | +1 | −1 | No change |
| +1 | −1 | −1 | +1 | −Δϕ |
| +1 | −1 | −1 | −1 | −Δϕ |
| −1 | +1 | +1 | +1 | +Δϕ |
| −1 | +1 | +1 | −1 | +Δϕ |
| −1 | +1 | −1 | +1 | No change |
| −1 | +1 | −1 | −1 | No change |
| −1 | −1 | +1 | +1 | +Δϕ |
| −1 | −1 | +1 | −1 | +Δϕ |
| −1 | −1 | −1 | +1 | No change |
| −1 | −1 | −1 | −1 | No change |

TABLE 2

Phase adjustment table for Type 2 feedback sequences

| Feedback Information (Type 2) | | | | Nominal value adjustment |
|---|---|---|---|---|
| +1 | +1 | +1 | +1 | No change |
| +1 | +1 | +1 | −1 | +Δϕ |
| +1 | +1 | −1 | +1 | No change |
| +1 | +1 | −1 | −1 | +Δϕ |
| +1 | −1 | +1 | +1 | −Δϕ |
| +1 | −1 | +1 | −1 | No change |
| +1 | −1 | −1 | +1 | −Δϕ |
| +1 | −1 | −1 | −1 | No change |
| −1 | +1 | +1 | +1 | No change |
| −1 | +1 | +1 | −1 | +Δϕ |
| −1 | +1 | −1 | +1 | No change |
| −1 | +1 | −1 | −1 | +Δϕ |
| −1 | −1 | +1 | +1 | −Δϕ |
| −1 | −1 | +1 | −1 | No change |
| −1 | −1 | −1 | +1 | −Δϕ |
| −1 | −1 | −1 | −1 | No change |

TABLE 3

Phase adjustment table for Type 3 feedback sequences

| Feedback Information (Type 3) | | | | Nominal value adjustment |
|---|---|---|---|---|
| +1 | +1 | +1 | +1 | No change |
| +1 | +1 | +1 | −1 | No change |
| +1 | +1 | −1 | +1 | +Δϕ |
| +1 | +1 | −1 | −1 | +Δϕ |
| +1 | −1 | +1 | +1 | No change |
| +1 | −1 | +1 | −1 | No change |
| +1 | −1 | −1 | +1 | +Δϕ |
| +1 | −1 | −1 | −1 | +Δϕ |
| −1 | +1 | +1 | +1 | −Δϕ |
| −1 | +1 | +1 | −1 | −Δϕ |
| −1 | +1 | −1 | +1 | No change |
| −1 | +1 | −1 | −1 | No change |
| −1 | −1 | +1 | +1 | −Δϕ |
| −1 | −1 | +1 | −1 | −Δϕ |
| −1 | −1 | −1 | +1 | No change |
| −1 | −1 | −1 | −1 | No change |

TABLE 4

Phase adjustment table for Type 4 feedback sequences

| Feedback Information (Type 4) | | | | Nominal value adjustment |
|---|---|---|---|---|
| +1 | +1 | +1 | +1 | No change |
| +1 | +1 | +1 | −1 | −Δφ |
| +1 | +1 | −1 | +1 | No change |
| +1 | +1 | −1 | −1 | −Δφ |
| +1 | −1 | +1 | +1 | +Δφ |
| +1 | −1 | +1 | −1 | No change |
| +1 | −1 | −1 | +1 | +Δφ |
| +1 | −1 | −1 | −1 | No change |
| −1 | +1 | +1 | +1 | No change |
| −1 | +1 | +1 | −1 | −Δφ |
| −1 | +1 | −1 | +1 | No change |
| −1 | +1 | −1 | −1 | −Δφ |
| −1 | −1 | +1 | +1 | +Δφ |
| −1 | −1 | +1 | −1 | No change |
| −1 | −1 | −1 | +1 | +Δφ |
| −1 | −1 | −1 | −1 | No change |

Finally, the phase adjustment is obtained from the row in the table corresponding to the feedback outcome. The step size ΔΦ is in this case a constant positive value, for example, 12 degrees.

The phase adjustment can be performed continuously whenever a new feedback signal is received. Tables 1-4 are periodically rotated by selecting the appropriate nominal value adjustment for each of the types as they are received. Alternatively, the process can be implemented at a slower rate, for example considering, for example only Type 1 and 3 sequences and ignoring Type 2 and Type 4 sequences (or vice versa).

In other examples, the adjustments may have different magnitudes. For example, large adjustments can be made in response to feedback signals indicating a greater difference between the qualities of the two perturbation directions.

A general expression for determining the step size IA that is applicable to the phase perturbation pattern of FIG. 2 is:

$$\Delta\Phi = f(s)$$

where
ΔΦ is the nominal value adjustment;
$f(s)$ is a scaling function, for example a piecewise linear function defined as:

$$f(s) = \begin{cases} \frac{b}{a}s, & -a \leq s \leq a \\ b, & s > a \\ -b, & s < -a \end{cases}$$

a and b are parameters of $f(s)$ defining the range of ΔΦ as described below.

$$s = \sum_{i=1}^{2(N_1+N_2)} FB_i \cdot W_i$$

$FB_i$ is the base station (receiver) feedback to phase difference $\phi_i$ at time slot i $$W_i = 2\frac{\Phi_i - \Phi_{nominal}}{\Phi_{MAX} - \Phi_{MIN}}$$

$$\Phi_{MAX} = \max(\Phi_i), \Phi_{MIN} = \min(\Phi_i), i = 1, 2 \ldots 2(N_1 + N_2)$$

$$\Phi_{nominal} = \frac{\Phi_{MAX} - \Phi_{MIN}}{2}$$

All phase values are "unwrapped" meaning they do not wrap around (e,g, the phase values can be more than 360 degrees).

Figure 5:
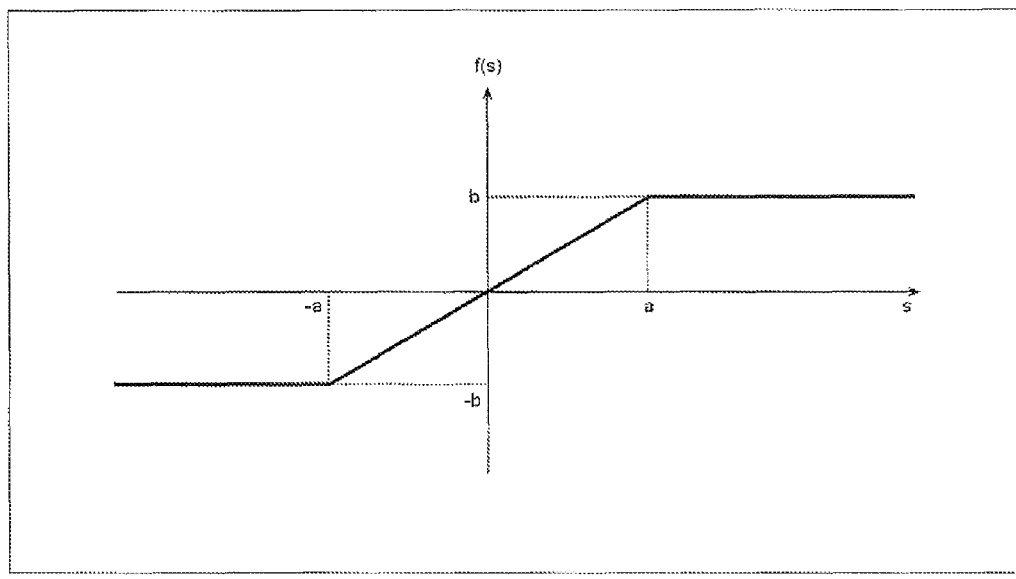
FIG. 5 shows a graph correlating a phase perturbation used by the network of FIG. 1 as a function of a parameter s.

The exemplary function $f(s)$ is depicted in FIG. 5.

Note that parameter s is a function of weighted values of the feedback signals. In the summation that defines s, $FB_i \in (-1,+1)$ and $-1 \leq W_i \leq 1$, hence the range of s is $-2(N_1+N_2) \leq s \leq 2(N_1+N_2)$. Since this may not be the desired range for ΔΦ, the function $f(s)$ is introduced to scale s linearly (for $-a \leq s \leq a$) and limit its magnitude (for $s < -a$ or $s > a$); hence according to the definition of $f(s)$ the range of ΔΦ becomes $-b \leq \Delta\Phi \leq b$. Thus, the size of the phase adjustment is controlled by parameters a and b in $f(s)$ as illustrated in FIG. 5. These parameters should be chosen appropriately for each perturbation pattern used. For the examples of FIG. 3, a and b could be, for example:
1) a=1, b=12 degrees
2) a=1.5, b=18 degrees
3) a=1, b=12 degrees
a=2.5, b=30 degrees.

It must be emphasized that the present invention is applicable to both symmetrical and unsymmetrical perturbation techniques.

While this disclosure has been described in terms of certain example and generally associated methods, alterations and permutations of the examples and methods will be apparent to those skilled in the art. Accordingly, the above descriptions of the examples does not define or constrain this disclosure. Other changes, substitutions, and alterations are also possible without departing from the spirit and scope of this disclosure, as defined by the following claims.

We claim:

1. A method of modifying a signal transmitted from a modifying communication device in communication with a feedback communication device, said signal being associated with a transmit diversity parameter, the transmit diversity parameter having a nominal value $\Phi_{nominal}$, said method comprising the steps of:

perturbing by said modifying communication device the transmit diversity parameter from said nominal value $\Phi_{nominal}$ at a perturbation rate and transmitting a perturbed signal resulting from the perturbation, said perturbed signal being perturbed over perturbation periods, each perturbation period being divided into 2(N1+N2) steps, said perturbed signal being perturbed by a differential phase ΔΦ for N1 steps and said perturbed signal being perturbed by 0 degrees during N2 steps;

receiving, by the modifying communication device, a feedback signal at a feedback rate from the feedback communication device, the feedback signal including feedback information relating to a receipt of the perturbed signal at said feedback communication device, said feedback signal including a sequence of feedback values, each feedback value FBi representing a feedback signal to a phase difference $\Phi_i$ during respective step i of said perturbation period; and based on said feedback signal, adjusting the nominal value $\Phi_{nominal}$ of said transmit diversity parameter by said ΔΦ, wherein said ΔΦ is a fraction less than one of said nominal value $\Phi_{nominal}$ and is determined by a scaling function f(s) wherein a and b are predefined ranges for said ΔΦ, $W_i$ are weighed values of the feedback values and said f(s) is defined as:

$$f(s) = \begin{cases} \frac{b}{a}s, & -a \leq s \leq a \\ b, & s > a \\ -b, & s < -a \end{cases}$$

$$s = \sum_{i=1}^{2(N_1+N_2)} FB_i \cdot W_i$$

$$W_i = 2\frac{\Phi_i - \Phi_{nominal}}{\Phi_{MAX} - \Phi_{MIN}}$$

$$\Phi_{MAX} = \max(\Phi_i), \Phi_{MIN} = \min(\Phi_i), i = 1, 2 \ldots 2(N_1+N_2)$$

$$\Phi_{nominal} = \frac{\Phi_{MAX} - \Phi_{MIN}}{2}.$$

2. The method of claim 1 wherein said perturbed signal is sent in consecutive time slots, said feedback signal includes the phase difference $\Phi_i$ corresponding to each time slot and said differential value ΔΦ is determined for each of said time slots.

3. A method of transmitting a transmitter signal from a transmitter to a receiver over a communication channel, the transmitter having a first and a second antenna transmitting respective first and second components of the transmitter signal, the method comprising the steps of:

perturbing in the transmitter a transmit diversity parameter by an adjustment value ΔΦ from a nominal value $\Phi_{nominal}$ at a perturbation rate by modulating the transmit diversity parameter with respect to the nominal value $\Phi_{nominal}$ in a first direction for at least said first component, said ΔΦ being a fraction of said nominal value $\Phi_{nominal}$, and transmitting, by the transmitter, perturbed signals generated based on the perturbed transmit diversity parameter;

receiving by the transmitter, a feedback information FBi relating to the perturbed signals as received by the receiver; and based at least on said feedback information FBi, adjusting at the transmitter the nominal value $\Phi_{nominal}$ of the transmit diversity parameter by increasing, decreasing, or preserving the nominal value $\Phi_{nominal}$, the increasing and decreasing being by said ΔΦ determined by a scaling function f(s) of weighed values ($W_i$) of the feedback information FBi;

wherein said increasing and decreasing of said transmit diversity parameter is performed during two intervals steps N1 and said perturbing of said nominal value $\Phi_{nominal}$ being performed during said two intervals of steps N1 by said ΔΦ, said two intervals defining a perturbation period of 2(N1+N2) steps, said ΔΦ being defined by said function f(s) wherein $$f(s) = \begin{cases} \frac{b}{a}s, & -a \leq s \leq a \\ b, & s > a \\ -b, & s < -a \end{cases}$$

$$s = \sum_{i=1}^{2(N_1+N_2)} FB_i \cdot W_i$$

$$W_i = 2\frac{\Phi_i - \Phi_{nominal}}{\Phi_{MAX} - \Phi_{MIN}}$$

$$\Phi_{MAX} = \max(\Phi_i), \Phi_{MIN} = \min(\Phi_i), i = 1, 2 \ldots 2(N_1+N_2)$$

$$\Phi_{nominal} = \frac{\Phi_{MAX} - \Phi_{MIN}}{2}$$

where $\Phi_i$ is a phase difference during respective step i of said perturbation period and a and b are predefined ranges for said ΔΦ.

4. The method of claim 3, wherein said transmitter is in a modifying communication device and said feedback information is in a feedback signal received by said modifying communication device, said feedback signal being a power control signal received according to a communication protocol.

5. The method of claim 4, wherein receiving said feedback signal comprises receiving said feedback signal at a feedback rate, and wherein said perturbation rate is substantially equivalent to the feedback rate.

6. The method of claim 4, wherein receiving said feedback signal comprises receiving said feedback signal at a feedback rate, and wherein said perturbation rate is a fraction of the feedback rate.

7. The method of claim 4 wherein generating said perturbed signals comprises perturbing said signals over a plurality of quality feedback time periods; and wherein receiving said feedback signal comprises receiving said feedback signal from the feedback communication device for each quality feedback time period from said plurality of feedback time periods.

8. The method of claim 3 further comprising simultaneously perturbing in the transmitter the transmit diversity parameter by said ΔΦ from the nominal value $\Phi_{nominal}$ at the perturbation rate by modulating the transmit diversity parameter with respect to the nominal value $\Phi_{nominal}$ in a second direction for said second component.

9. A method of transmitting a signal from a transmitter to a receiver over a communication channel, the transmitter having a first and a second antenna transmitting respective first and second components of the signal, the method comprising the steps of:

receiving by said transmitter a phase difference ($\Phi_i$) between said first and second component; and perturbing simultaneously said first and second components by first and second differential phases, respectively, wherein said first and second differential phases have the same value ΔΦ but opposite signs, said differential phases being a fractional value of said phase difference $\Phi_i$;

wherein said perturbing is performed during a perturbation period of 2(N1+N2) steps consisting of N1 steps during which the signal is perturbed by said +ΔΦ followed by N2 steps during which no perturbation occurs followed by N1 steps during which the signal is perturbed by said −ΔΦ followed by N2 steps during which no perturbation occurs, and wherein for each step i a corresponding feedback signal FBi is received and wherein the first and second differential values are generated based on a function f(s) defined as $$f(s) = \begin{cases} \frac{b}{a}s, & -a \leq s \leq a \\ b, & s > a \\ -b, & s < -a \end{cases}$$

$$s = \sum_{i=1}^{2(N_1+N_2)} FB_i \cdot W_i$$

$$W_i = 2\frac{\Phi_i - \Phi_{nominal}}{\Phi_{MAX} - \Phi_{MIN}}$$

$$\Phi_{MAX} = \max(\Phi_i), \Phi_{MIN} = \min(\Phi_i), i = 1, 2 \ldots 2(N_1 + N_2)$$

$$\Phi_{nominal} = \frac{\Phi_{MAX} - \Phi_{MIN}}{2}$$

where $W_i$ are weighed values of the feedback signal FBi,
a and b are predefined ranges for said $\Delta\Phi$, and
$\Phi_{nominal}$ nominal value of the phase difference $\Phi_i$.

10. The method of claim 9 wherein said transmitter is in a modifying communication device and said feedback information is in the feedback signal FBi received by said modifying communication device, the transmitter transmits to the receiver the signal with a transmit diversity parameter, and wherein the modifying communication device receives from the receiver the feedback signal FBi dependent on said transmit diversity parameter, said feedback signal being indicative of said phase difference $\Phi_i$.

11. The method of claim 10 wherein said signal from said transmitter is sent in consecutive time slots, said feedback signal includes a quality feedback corresponding to each time slot, and said value $\Delta\Phi$ is determined for each of said time slots.

* * * * *